(12) United States Patent
Matsuda

(10) Patent No.: US 10,596,894 B2
(45) Date of Patent: Mar. 24, 2020

(54) VEHICLE LOWER PORTION STRUCTURE

(71) Applicant: Toyota Jidosha Kabushiki Kaisha, Toyota-shi, Aichi-ken (JP)

(72) Inventor: Hidenori Matsuda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/249,638

(22) Filed: Jan. 16, 2019

(65) Prior Publication Data
US 2019/0232776 A1 Aug. 1, 2019

(30) Foreign Application Priority Data

Jan. 30, 2018 (JP) ................................ 2018-013927

(51) Int. Cl.
| | |
|---|---|
| *B60K 6/40* | (2007.10) |
| *B60K 1/00* | (2006.01) |
| *B60K 6/28* | (2007.10) |
| *B60K 11/04* | (2006.01) |
| *B60K 15/01* | (2006.01) |
| *B60K 15/03* | (2006.01) |

(Continued)

(52) U.S. Cl.
CPC ............... *B60K 6/40* (2013.01); *B60K 1/00* (2013.01); *B60K 6/28* (2013.01); *B60K 11/04* (2013.01); *B60K 15/01* (2013.01); *B60K 15/03* (2013.01); *B60K 2001/005* (2013.01); *B60K 2015/0634* (2013.01); *B60Y 2200/92* (2013.01); *B60Y 2306/01* (2013.01); *B62D 25/082* (2013.01)

(58) Field of Classification Search
CPC ... B60K 6/28; B60K 6/40; B60K 1/00; B60K 11/04; B60K 15/01; B60K 15/03; B60K 2001/005; B60K 2015/0634; B60Y 2200/92; B60Y 2306/01; B62D 25/082
See application file for complete search history.

(56) References Cited

U.S. PATENT DOCUMENTS

| | | | |
|---|---|---|---|
| 2005/0006168 A1* | 1/2005 | Iwasaka | B60H 1/00207 180/292 |
| 2011/0284298 A1* | 11/2011 | Ajisaka | B60H 1/00535 180/65.21 |
| 2014/0287284 A1 | 9/2014 | Shibata | |

(Continued)

FOREIGN PATENT DOCUMENTS

| | | |
|---|---|---|
| JP | 2006-199051 A | 8/2006 |
| JP | 2013-107420 A | 6/2013 |

*Primary Examiner* — Bryan A Evans
(74) *Attorney, Agent, or Firm* — Dinsmore & Shohl LLP

(57) ABSTRACT

A vehicle lower portion structure has an internal combustion engine that is disposed on one side in a vehicle width direction in a power unit compartment, an inverter that is disposed on another side in the vehicle width direction in the power unit compartment, an exhaust pipe that extends in a vehicle front-rear direction through a dash panel separating the power unit compartment from a vehicle cabin, and is disposed within a floor tunnel that is provided in a central portion in the vehicle width direction at least at a position of the dash panel, and whose one end portion is connected to the internal combustion engine, a battery that is provided on a vehicle rear side of the dash panel, high-voltage power cables that extend in the vehicle front-rear direction on another side in the vehicle width direction and connect the inverter and the battery together.

7 Claims, 6 Drawing Sheets

(51) Int. Cl.
*B62D 25/08* (2006.01)
*B60K 15/063* (2006.01)

(56) References Cited

U.S. PATENT DOCUMENTS

| | | | |
|---|---|---|---|
| 2016/0052554 A1* | 2/2016 | Ozawa | B62D 21/152 |
| | | | 296/187.09 |
| 2016/0221609 A1* | 8/2016 | Furusaki | B62D 21/152 |
| 2016/0272248 A1* | 9/2016 | Furusaki | B62D 21/152 |

* cited by examiner

VEHICLE LOWER PORTION STRUCTURE

CROSS-REFERENCE TO RELATED APPLICATION

This application is based on and claims priority under 35 USC 119 from Japanese Patent Application No. 20184013927 filed on Jan. 30, 2018, the disclosure of which is incorporated by reference herein.

BACKGROUND

Technical Field

The present disclosure relates to a vehicle lower portion structure.

Related Art

A structure is disclosed in Japanese Unexamined Patent Application (JP-A) No. 2006-199051 in which there is provided a battery that is used to supply drive power to a motor, and an inverter that controls the supply of power from the battery to the motor. The battery and the inverter are connected together via a wire harness (i.e., high-voltage power cables), and this wire harness is laid alongside and on the lower side of a front side member.

In the technology disclosed in JP-A No. 2006-199051, the high-voltage power cables are protected in the event of a frontal collision or the like by the front side member bearing the collision load. Additionally, liquid coolant pipes and the like are provided in order to cool the battery, however, no consideration is given to the layout of the liquid coolant pipes in the aforementioned patent literature. Because of this, there is room for improvement from the standpoint of ensuring that the cooling performance of the liquid coolant pipes is maintained at the same time as power is supplied efficiently via the high-voltage power cables.

SUMMARY

The present disclosure was conceived in view of the above-described circumstances, and it is an object thereof to provide a vehicle lower portion structure that enables the cooling performance of liquid coolant pipes to be maintained at the same time as power is supplied efficiently via high-voltage power cables.

A vehicle lower portion structure according to a first aspect has an internal combustion engine that is disposed on one side, in a vehicle width direction, in a power unit compartment at a vehicle front portion, an inverter that is disposed on another side in the vehicle width direction in the power unit compartment, an exhaust pipe that extends in a vehicle front-rear direction through a dash panel separating the power unit compartment from a vehicle cabin and is disposed within a floor tunnel that is provided in a central portion in the vehicle width direction at least at a position of the dash panel, and whose one end portion is connected to the internal combustion engine, a battery that is provided on a vehicle rear side of the dash panel, high-voltage power cables that extend in the vehicle front-rear direction on the another side in the vehicle width direction and connect the inverter and the battery together, and liquid coolant pipes that extend in the vehicle front-rear direction on the other side in the vehicle width direction and cause a liquid coolant to circulate between a heat exchanger, which is provided in the vehicle front portion, and the battery.

In the vehicle lower portion structure according to the first aspect, an internal combustion engine and an inverter are disposed in a power unit compartment in a vehicle front portion. The internal combustion engine is disposed on one side in the vehicle width direction, while the inverter is disposed on the other side in the vehicle width direction. The power unit compartment is separated from the vehicle cabin by a dash panel, and an exhaust pipe extends in the vehicle front-rear direction through this dash panel. Furthermore, the exhaust pipe is disposed inside a floor tunnel that is provided in a central portion in the vehicle width direction at least at the position where the dash panel is located. Here, a battery is provided on a vehicle rear side of the dash panel, and this battery is connected to the inverter via high-voltage power cables. These high-voltage power cables also extend in the vehicle front-rear direction on the other side in the vehicle width direction in the same way as the inverter. As a result, compared with a structure in which the high-voltage power cables extend on the one side in the vehicle width direction, the length of the high-voltage power cables may be shortened.

Furthermore, a heat exchanger is provided in the vehicle front portion, and this heat exchanger is connected to the battery by liquid coolant pipes, so that a liquid coolant is circulated between the heat exchanger and the battery. By causing the liquid coolant to circulate in this way between the heat exchanger and the battery, the battery may be inhibited from heating up to a high temperature even if a large capacity battery is used. Furthermore, the liquid coolant pipes extend in the vehicle front-rear direction on the other side in the vehicle width direction in the same way as the high-voltage power cables. As a result, the liquid coolant pipes may be located away from exhaust pipe which is disposed in the central portion in the vehicle width direction, so that it is difficult for the liquid coolant pipes to be affected by heat from the exhaust pipe. In other words, it is possible to inhibit the liquid coolant inside the liquid coolant pipes from being heated by heat from the exhaust pipe.

A vehicle lower portion structure according to a second aspect is characterized in that, in the first aspect, a fuel tank is disposed on the vehicle rear side of the dash panel, the fuel tank and the internal combustion engine are connected to each other by a fuel pipe that extends in the vehicle front-rear direction, and the fuel pipe is disposed further to the one side in the vehicle width direction than the exhaust pipe at the position of the dash panel.

In the vehicle lower portion structure according to the second aspect, a fuel pipe is disposed on the one side in the vehicle width direction of the exhaust pipe at the position of the dash panel. As a result, the high-voltage power cables and the fuel pipe are disposed on mutually opposite sides so as to sandwich the exhaust pipe and compared with a structure in which the high-voltage power cables and the fuel pipe are placed adjacent to each other, safety is improved.

A vehicle lower portion Structure according to a third aspect is characterized in that, in the first or second aspects, a front side member that extends in the vehicle front-rear direction and whose rear end portion is connected to the dash panel is provided on the other side in the vehicle width direction of the inverter, and the high-voltage power cables and the liquid coolant pipes extend in a vehicle up-down direction following the dash panel along an inner side surface on an inner side in the vehicle width direction of the rear end portion of the front side member.

In the vehicle lower portion structure according to the third aspect, a front side member is provided further to the other side in the vehicle width direction than the inverter. This front side member extends in the vehicle front-rear direction. Additionally, a rear end portion of the front side member is connected to the dash panel, and the high-voltage power cables and the liquid coolant pipes extend in the vehicle up-down direction following the dash panel along an inner side surface on an inner side in the vehicle width direction of the rear end portion of this front side member. As a result, in the event of a vehicle frontal collision, even if the transmission and the like that is disposed underneath the inverter are moved to the vehicle rearward side (i.e., towards the dash panel side), it is possible to inhibit the high-voltage power cables and the liquid coolant pipes from becoming caught between the transmission and the like and the dash panel.

A vehicle lower portion, structure according to a fourth aspect is characterized in that, in the third aspect, the high-voltage power cables are disposed closer to the front side member than are the liquid coolant pipes.

In the vehicle lower portion structure according to the fourth aspect, the high-voltage power cables, in particular, are inhibited from becoming caught between the transmission and the like and the dash panel in the event of a vehicle frontal collision.

A vehicle lower portion structure according to a fifth aspect is characterized in that, in the fourth aspect, a recessed portion that is recessed towards an outer side in the vehicle width direction is formed on the inner side surface of the front side member, and a portion of the high-voltage power cables is laid inside the recessed portion.

In the vehicle lower portion structure according to the fifth aspect, because a portion of the high-voltage power cables is laid inside the recessed portion, even if the transmission and the like are pushed closer to the front side member, it is still possible to inhibit the high-voltage power cables from being caught between the transmission and the front side member.

A vehicle lower portion structure according to a sixth aspect is characterized in that, in the fifth aspect, a bracket is provided that covers the recessed portion from the inner side in the vehicle width direction, and a portion of the high-voltage power cables is laid inside the recessed portion so as to be held by the bracket.

In the vehicle lower portion structure according to the sixth aspect, because a portion of the high-voltage power cables is held by a bracket that covers the recessed portion from the inner side in the vehicle width direction, the high-voltage power cables may be held within the recessed portion.

A vehicle lower portion structure according to a seventh aspect is characterized in that, in the sixth aspect, the bracket is attached in a cantilever state to the inner side surface of the front side member.

In the vehicle lower portion, structure according to the seventh aspect, the bracket is attached in a cantilever state to the inner side surface of a front side member. Because of this, when an impact load is input into the front side member and causes the front side member to be deformed, the high-voltage power cables, together with the bracket, may be separated from the front side member.

As has been described above, according to the vehicle lower portion structure according to the first aspect, the cooling performance of the liquid coolant pipes is maintained at the same time as power is supplied efficiently via the high-voltage power cables.

According to the vehicle lower portion structure according to the second aspect, safety is improved.

According to the vehicle lower portion structure according to the third aspect, the high-voltage power cables and the liquid coolant pipes are inhibited from being broken in the event of a vehicle frontal collision.

According to the vehicle lower portion structure according to the fourth aspect, superior protection may be provided for the high-voltage power cables, in particular, in the event of a vehicle frontal collision.

According to the vehicle lower portion structure according to the fifth aspect, the ability to protect the high-voltage power cables is improved.

According to the vehicle lower portion structure according to the sixth aspect, the ability to protect the high-voltage power cables is maintained at a superior level.

According to the vehicle lower portion structure according to the seventh aspect, the high-voltage power cables may be protected even if the front side member is deformed.

BRIEF DESCRIPTION OF THE DRAWINGS

Exemplary embodiments of the present disclosure will be described in detail based on the following figures, wherein.

DETAILED DESCRIPTION

Hereinafter, a vehicle lower portion structure 10 according to an exemplary embodiment will be described with reference to the drawings. Note that an arrow FR, an arrow UP, and an arrow LH that are shown in the appropriate drawings respectively indicate a vehicle forward direction, a vehicle upward direction, and a vehicle left side. Hereinafter, if front-rear up-down, or left-right directions are used in the following description, then, unless specifically stated otherwise, these refer respectively to the front-rear directions of the vehicle, the up-down directions of the vehicle and the left-right directions facing in the direction of forward travel of the vehicle.

Figure 1:
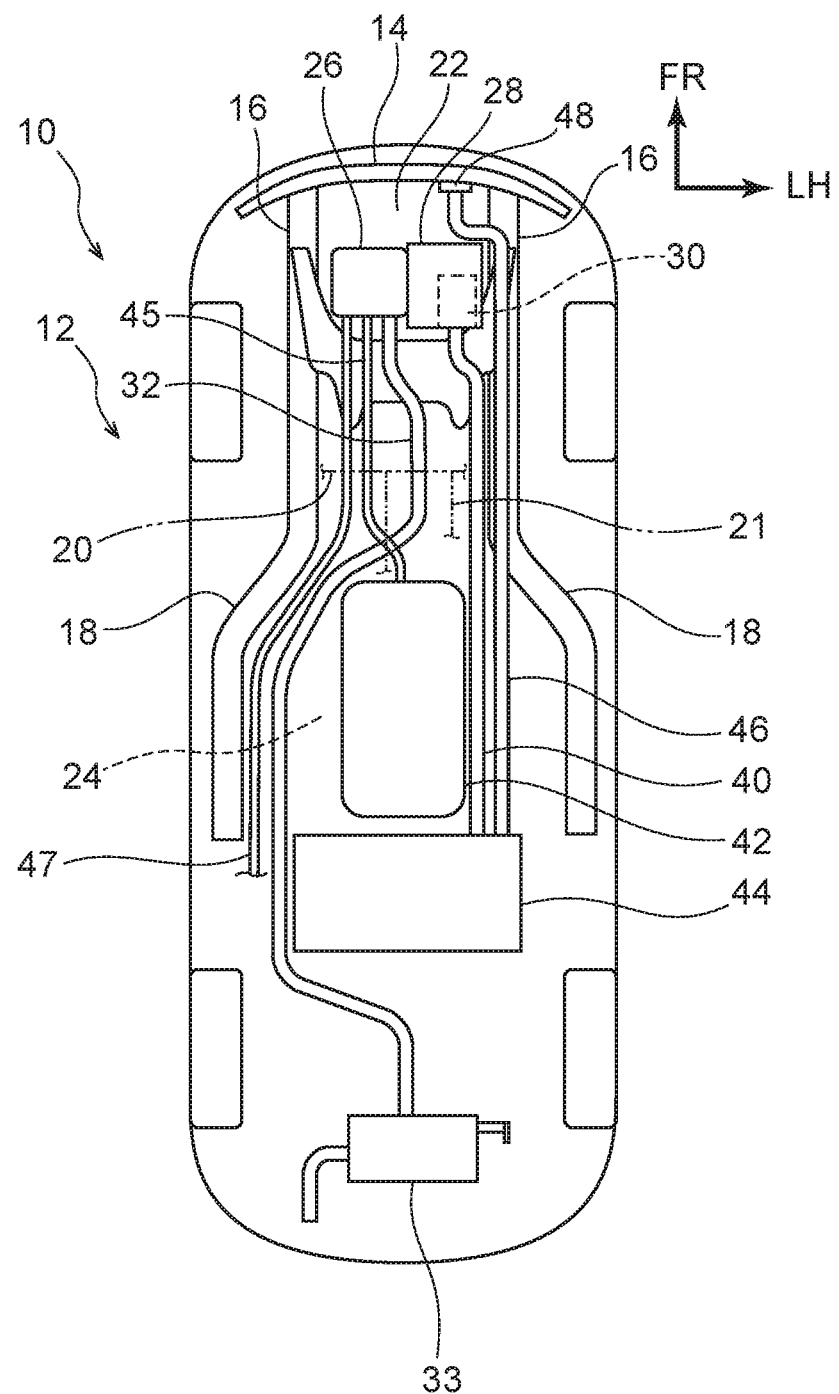
FIG. 1 is a bottom view showing a vehicle in which a vehicle lower portion structure according to an exemplary embodiment is applied.

As is shown in FIG. 1, a bumper reinforcement 14 is provided in a front portion of a vehicle 12 to which the vehicle lower portion structure of the present exemplary embodiment has been applied. The bumper reinforcement 14 extends in a vehicle width direction, and both sides in the vehicle width direction of the bumper reinforcement 14 are curved back towards the vehicle rear side.

Front side members 16, which are vehicle frame components, extend toward the vehicle rear side from both end portions in the vehicle width direction of the bumper reinforcement 14. A pair of left and right front side members 16 are provided, and they extend substantially in parallel with each other in the vehicle front-rear direction. A front end portion of each front side member 16 is connected to the bumper reinforcement 14, while a rear end portion of each front side member 16 is connected to a dash panel 20 (described below: see FIG. 4).

Under reinforcements 18 extend continuously from the rear end portion of each front side member 16 towards the vehicle rear side, and these under reinforcements 18 are both formed substantially in a crank shape when looked at in a vehicle bottom view such that a rear side of each under reinforcement 18 is located on the outer side in the vehicle width direction of a front side thereof.

Here, the dash panel 20 that extends in the vehicle width direction and separates a power unit compartment 22 from a vehicle cabin 24 is provided in the front portion of the vehicle 12, and the vehicle front side of the dash and 20 forms the power unit compartment 22. Note that the vehicle cabin 24 is a space in the vehicle 12 which is occupied by a vehicle occupant. Consequently, although the vehicle cabin 24 is not shown in FIG. 1, the vehicle cabin 24 is formed by a space on the vehicle rear side of the dash panel 20 between a floor panel and a ceiling portion.

Figure 3:
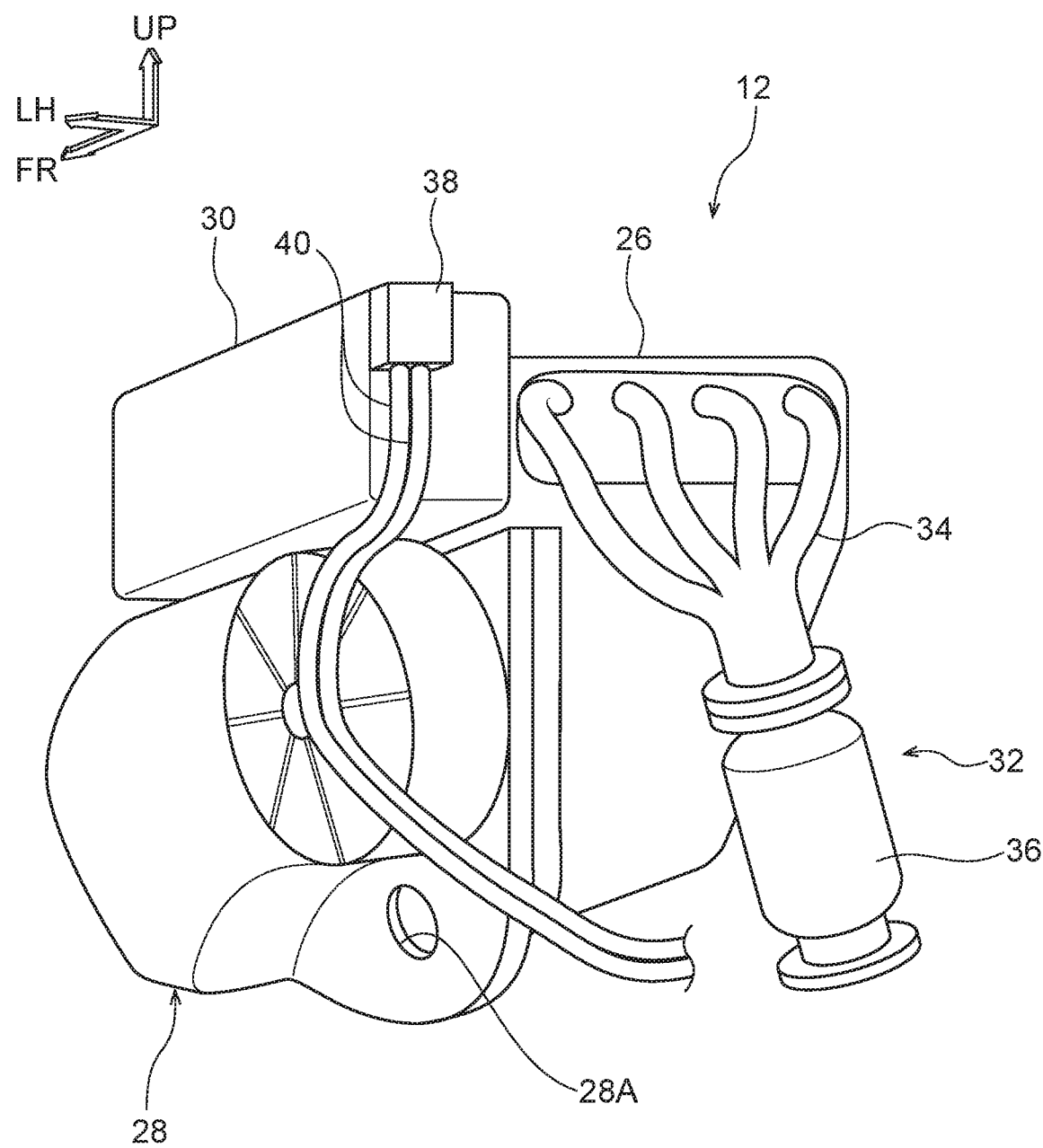
FIG. 3 is a perspective view as seen from a diagonally downward direction showing a power unit of a vehicle according to an exemplary embodiment.

An engine 26 serving as an internal combustion engine, a transmission 28, and an inverter 30 are disposed in the power unit compartment 22. As is shown in FIG. 3, the engine 26 is disposed on the vehicle right side (i.e., on one side in the vehicle width direction), and an exhaust manifold 34 forming part of an exhaust pipe 32 is connected to a rear portion of the engine 26. Additionally, a catalyst 36 is connected to the exhaust manifold 34. Note that the exhaust manifold 34 and the catalyst 36 have been omitted from FIG. 1. Moreover, the term 'on the vehicle right side' referred to here is defined as meaning that a center in the vehicle width direction of the engine 26 is disposed on the right side of a center in the width direction of the vehicle 12. In other words, provided that the center in the vehicle width direction of the engine 26 is disposed on the right side of the center in the width direction of the vehicle 12, then structures in which a portion of the engine 26 is disposed on the left side (i.e., on another side in the vehicle transverse direction) of the center in the width direction of the vehicle 12 are included in this definition.

The transmission 28 is disposed on the vehicle left side (i.e., on the other side in the vehicle width direction), and the engine 26 and transmission 28 are aligned with each other in the vehicle width direction. Additionally, a driveshaft mounting hole 28A is formed in a lower portion of the transmission 28. Furthermore, an in-built motor (not shown in the drawings) is provided in the transmission 28. In other words, the vehicle 12 of the present exemplary embodiment is a hybrid vehicle that is provided with both the engine 26 and a motor as drive sources.

The inverter 30 is provided on the vehicle upper side of the transmission 28. The inverter 30 is an apparatus that modulates power from a battery 44 (described below) so as to generate voltage that is applied to the motor, and this inverter 30 is also disposed on the vehicle left side in the same way as the transmission 28. Two high-voltage power cables 40 are connected via a coupler 38 to the inverter 30. The high-voltage power cables 40 are described below. Note that the term 'on the vehicle left side' referred to here is defined as meaning that a center in the vehicle width direction of the inverter 30 is disposed on the left side of a center in the width direction of the vehicle 12. In other words, provided that the center in the vehicle width direction of the inverter 30 is disposed on the left side of the center in the width direction of the vehicle 12, then structures in which a portion of the inverter 30 is disposed on the right side (i.e., on the one side in the vehicle transverse direction) of the center in the width direction of the vehicle 12 are included in this definition.

As is shown in FIG. 1, the exhaust pipe 32 extends in the vehicle front-rear direction. More specifically, the exhaust pipe 32 extends substantially rectilinearly from the engine 26 towards the vehicle rear side passing through the dash panel 20, and is disposed within a floor tunnel 21 which is formed in a central portion in the vehicle width direction. The exhaust pipe 32 bends to the vehicle right side at a position a little on the vehicle front side of a fuel tank 42 (described below), and continues on the vehicle right side towards the vehicle rear side alongside the under reinforcement 18. A rear end portion of the exhaust pipe 32 then bends towards the vehicle left side, and thereafter bends once again towards the vehicle rear side, and is then connected to a muffler 33.

The fuel tank 42 is provided on the vehicle rear side of the dash panel 20. The fuel tank 42 is disposed in a central portion in the vehicle front-rear direction, and a fuel pipe 45 is connected to the fuel tank 42.

The fuel pipe 45 extends in the vehicle front-rear direction, and a rear end portion of the fuel pipe 45 is connected to the fuel tank 42. A front end portion of the fuel pipe 45 passes through the dash panel 20 and extends to the power unit compartment 22 where it is connected to the engine 26. In other words, the fuel tank 42 and the engine 26 are connected to each other by the fuel pipe 45. Here, the fuel pipe 45 is located on the vehicle right side of the exhaust pipe 32 at the position of the dash panel 20. Additionally, a rear brake pipe 47 extends in the vehicle front-rear direction on the vehicle right side of the fuel pipe 45. The rear brake pipe 47 extends alongside the front side member 16 and the under reinforcement 18.

The battery 44 is provided on the vehicle rear side of the fuel tank 42. The battery 44 is formed in a substantially rectangular shape whose longitudinal direction extends in the vehicle width direction when looked at in a vehicle bottom view, and a plurality of battery cells (riot shown in the drawings) are housed therein. In addition, the high-voltage power cables 40 and liquid coolant pipes 46 are also connected to the battery 44.

The high-voltage power cables 40 extend in the vehicle front-rear direction so as to connect the inverter 30 and the battery 44 together, and extend substantially rectilinearly in the vehicle front-rear direction on the vehicle left side. In other words, the high-voltage power cables 40 are disposed on the opposite side from the fuel pipe 45 sandwiching the exhaust pipe 32 at least at the position of the dash panel 20. Furthermore, as is described above, a front end portion of each high-voltage power cable 40 is connected via the coupler 38 to the inverter 30 (see FIG. 3). Additionally, a rear end portion of each high-voltage power cable 40 is connected to an end portion on the vehicle left side of the battery 44. Note that, in FIG. 1, only one high-voltage power cable 40 is shown in order to simplify the illustration.

Figure 2:
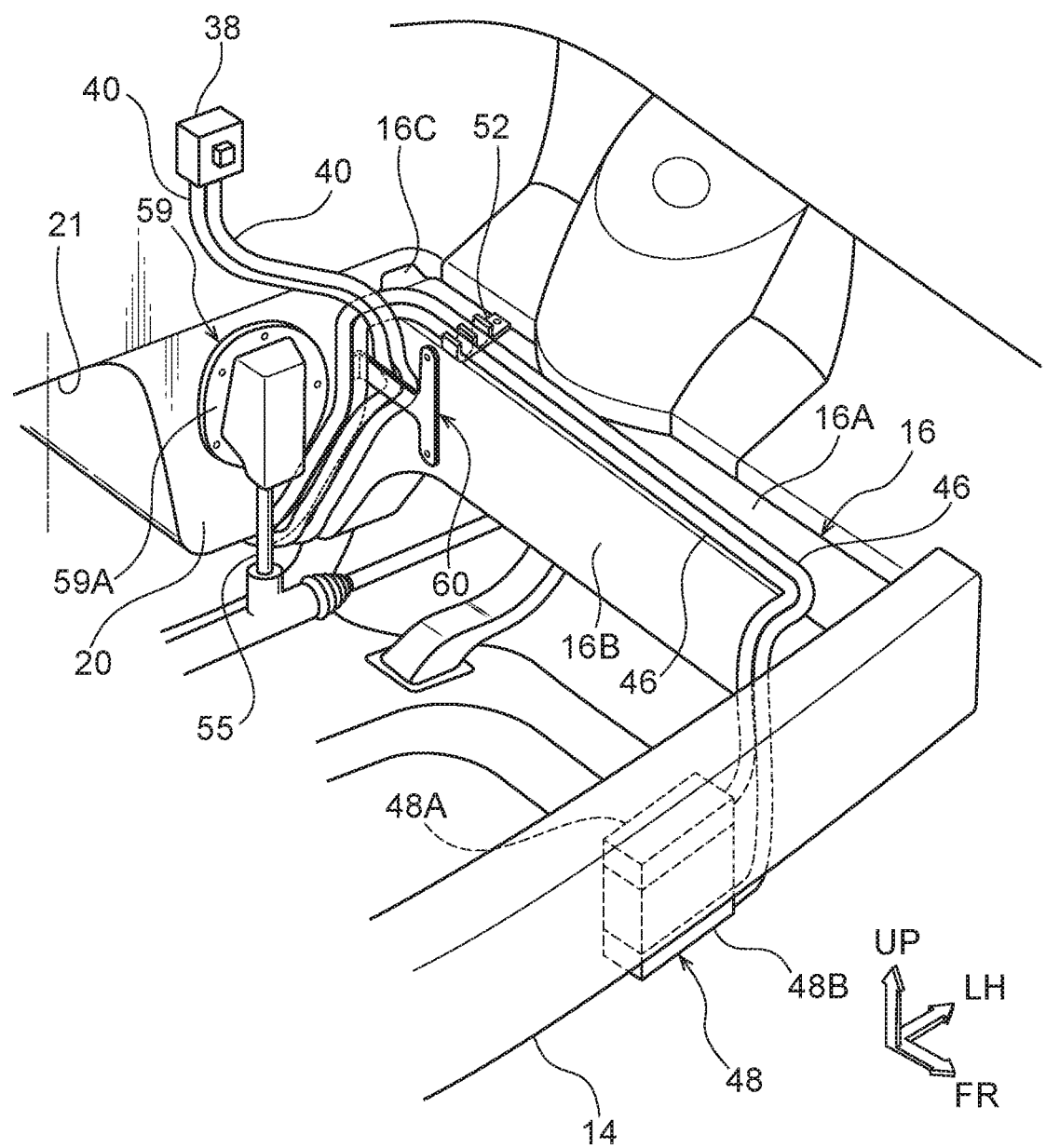
FIG. 2 is a perspective view as seen from a diagonally upward direction showing a front portion of a vehicle according to an exemplary embodiment.

Separately from the high-voltage power cables 40, the liquid coolant pipes 46 extend in the vehicle front-rear direction on the vehicle left side. As is shown in FIG. 2, two liquid coolant pipes 46 are provided, however, in FIG. 1, only one liquid coolant pipe 46 is shown in order to simplify the illustration. A rear end portion of each liquid coolant pipe 46 is connected to the end portion on the vehicle left side of the battery 44, while a front end portion of each liquid coolant pipe 46 is connected to a radiator 48 which is serving as a heat exchanger.

As is shown in FIG. 2, the radiator 48 is a cooling-only heat exchanger for the battery 44, and is formed so as to include an upper tank 48A and a lower tank 48B. The liquid coolant pipes 46 are connected to both the upper tank 48A and the lower tank 48B. In this structure, liquid coolant that flows through one liquid coolant pipe 46 into the radiator 48 is cooled by undergoing a heat exchange process in the radiator 48. The liquid coolant then flows back through the other liquid coolant pipe 46 and cools down the battery 44. In other words, the battery 44 is cooled by liquid coolant being circulated through the liquid coolant pipes 46 between the radiator 48 and the battery 44 by a pump (not shown in the drawings).

Here, the two liquid coolant pipes 46 extend on the vehicle left side from the radiator 48, and continue alongside an upper surface 16A of the front side member 16 towards the vehicle rear side as far as the rear end portion of the front side member 16. At the rear end portion of the front side member 16, the liquid coolant pipes 46 extend in the vehicle up-down direction following the dash panel 20 along an inner side surface 16B on the inner side in the vehicle width direction of the front side member 16. Note that a clamp component 52 is provided on an upper surface 16A of the front side member 16, and the liquid coolant pipes 46 are held by this clamp component 52.

In the same way as the liquid coolant pipes 46, the two high-voltage power cables 40 also extend in the vehicle up-down direction following the dash panel 20 along the inner side surface 16B. More specifically, the high-voltage power cables 40 extend from the inverter 30 (see FIG. 3) towards the vehicle lower side, and continue on from there towards the vehicle left side as far as the inner side surface 16B of the front side member 16. From there, they extend in the vehicle up-down direction along the inner side surface 16B following the dash panel 20.

Figure 4:
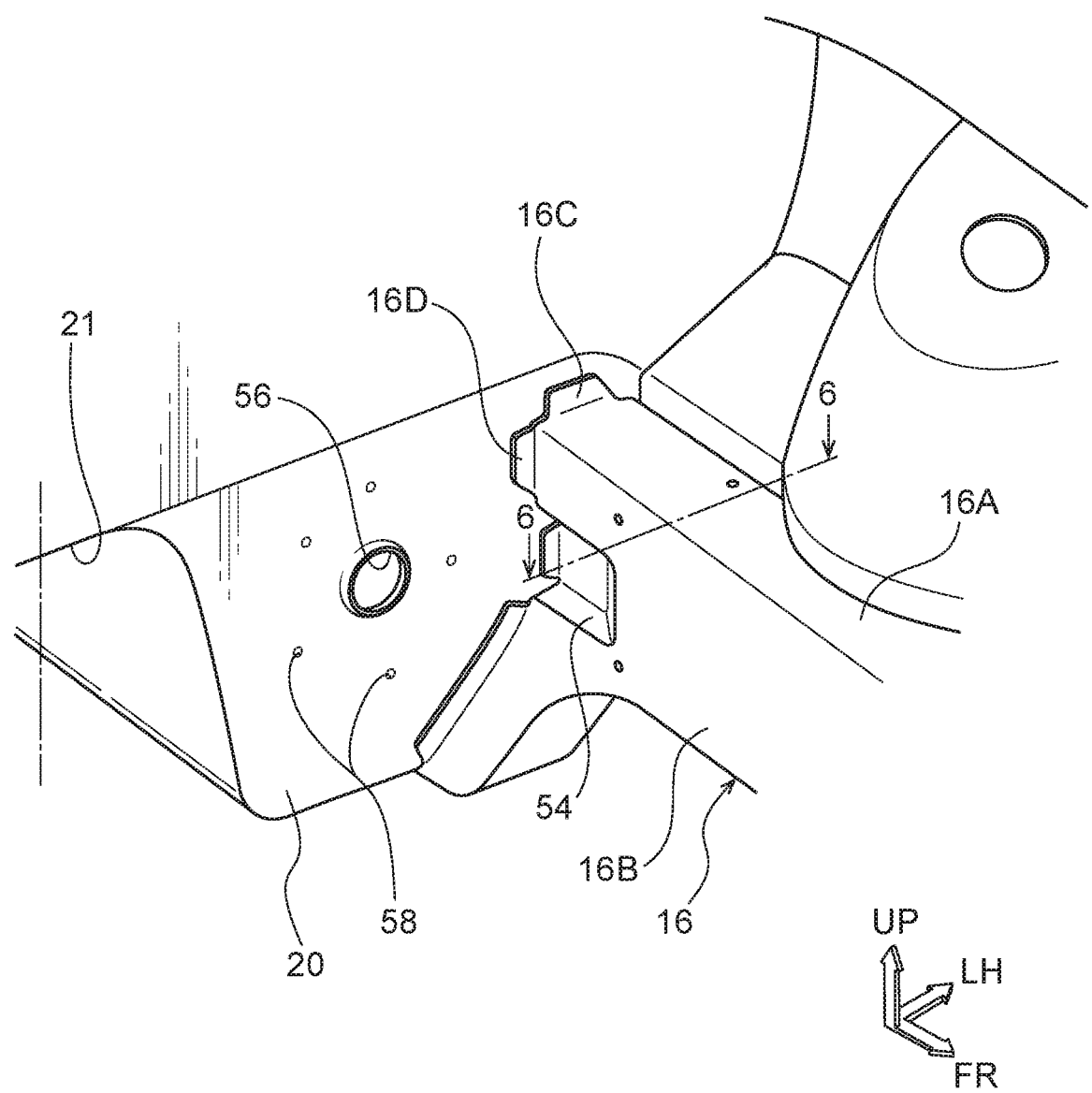
FIG. 4 is a perspective view as seen from a diagonally upward direction showing a front portion of a vehicle according to an exemplary embodiment, and shows a state when high-voltage power cables and liquid coolant pipes are removed.

Here, as is shown in FIG. 4, a recessed portion 54, which is recessed towards the vehicle left side (i.e., towards the outer side in the vehicle width direction) is formed in the inner side surface 16B in the rear end portion of the front side member 16. Furthermore, a rear end portion of the upper surface 16A of the front side member 16 is formed as an upper side flange 16C that is folded towards the vehicle upper side following the dash panel 20, and this upper side flange 16C is joined by spot welding or the like to the dash panel 20. Furthermore, a rear end portion of the inner side surface 16B of the front side member 16 is formed as an inner side flange 16D that is folded towards the vehicle right side (i.e., towards the inner side in the vehicle width direction) following the dash panel 20, and this inner side flange 16D is joined by spot welding or the like to the dash panel 20. The recessed portion 54 is formed on the vehicle lower side of the inner side flange 16D.

The recessed portion 54 is formed by cutting a notch towards the outer side in the vehicle width direction in a central portion in the vehicle-down direction of the inner side surface 16B. A flange which is bent towards the vehicle right side along the dash panel 20 is formed in a rear end portion of the recessed portion 54, and this flange is joined by spot welding or the like to the dash panel 20. Additionally, a through hole 56 is formed on the inner side in the vehicle width direction of the front side member 16, and an intermediate shaft 55 (see FIG. 2) is inserted into this through hole 56. Furthermore, a plurality of bolt holes 58 are formed around the through hole 56 in the dash panel 20.

As is shown in FIG. 2, by screwing bolts (not shown in the drawings) into the plurality of bolt holes 58, a cover component 59 is fastened to the dash panel 20. The cover component 59 is formed in a shape that covers the through hole 56 from the vehicle front side, and a flange 59A is formed on a peripheral edge portion of the cover component 59. The cover component 59 is attached by inserting bolts from the vehicle front side of the flange 59A. An aperture is provided on the lower side of the cover component 59, and the intermediate shaft 55 extends from this aperture towards the vehicle lower side. Note that, as is shown in FIG. 4, in the present exemplary embodiment, as an example five bolt holes 58 are formed around the through hole 56. Additionally, the bolt holes 58 are formed in positions away from the front side member 16 so that they do not interfere with the high-voltage power cables 40 and the liquid coolant pipes 46.

Figure 5:
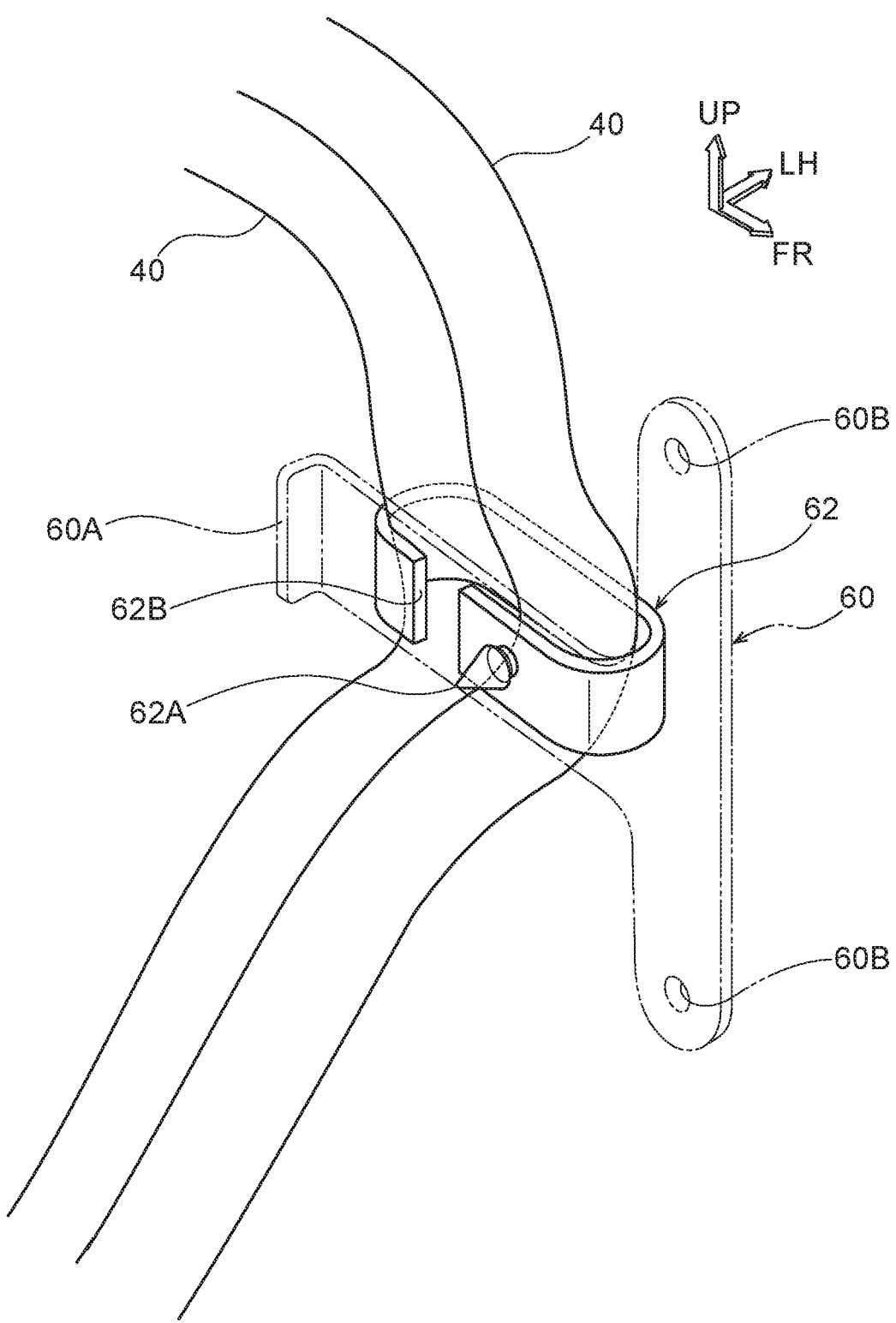
FIG. 5 is an enlarged perspective view showing an enlargement of principal portions of the high-voltage power cables according to an exemplary embodiment.
Figure 6:
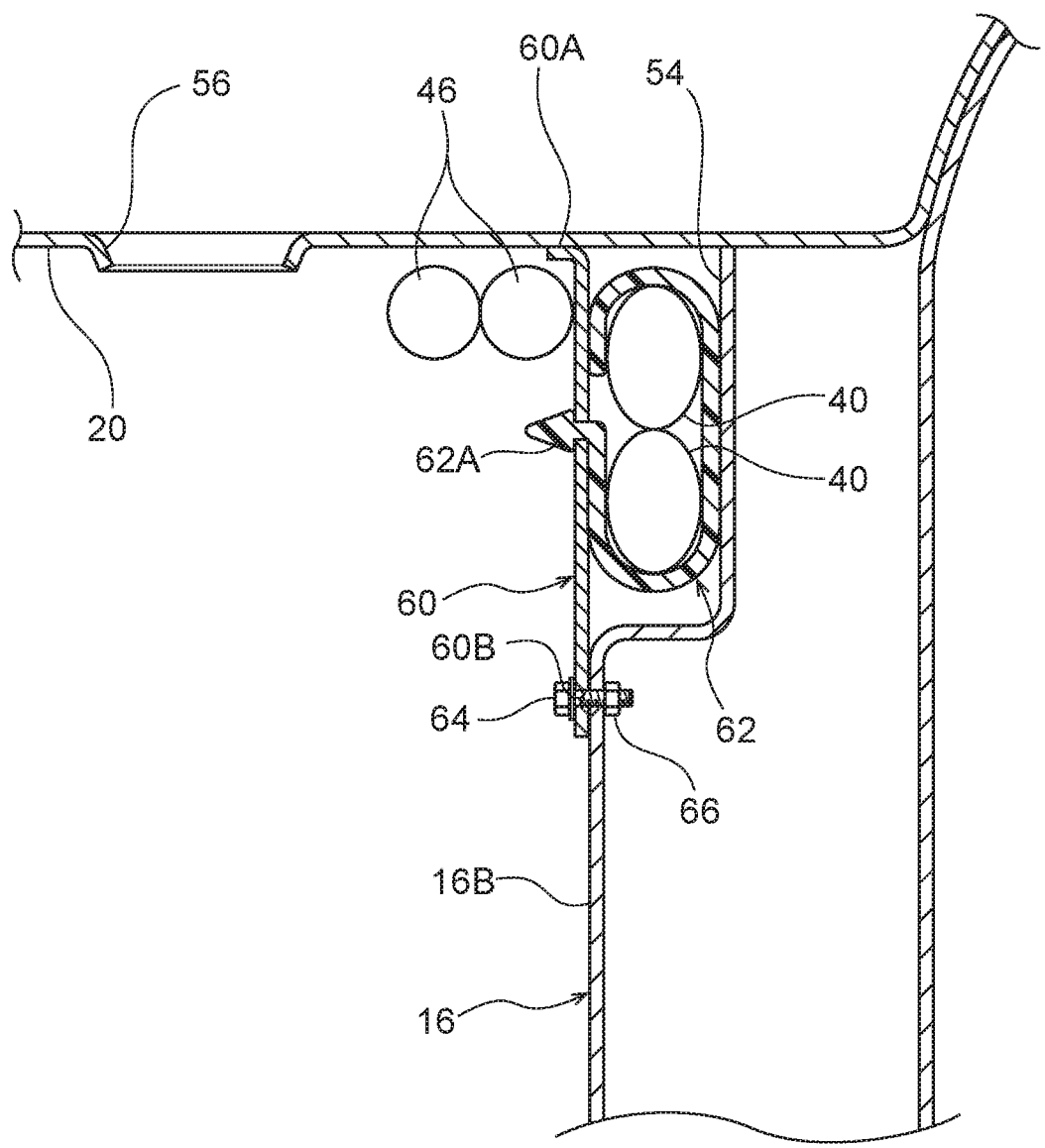
FIG. 6 is a cross-sectional view showing an enlargement of a cross-section across a line 6-6 shown in FIG. 4.

As is shown in FIG. 6, the two high-voltage power cables 40 are held by a bracket 60 such that a portion thereof lies inside the recessed portion 54 formed in the inner side surface 16B of the front side member 16. More specifically, the recessed portion 54 is covered from the inner side in the vehicle width direction by the bracket 60. As is shown in FIG. 5, the bracket 60 is formed substantially in a T-shape, and a rear end portion of the bracket 60 is formed as a folded portion 60A that is folded towards the inner side in the vehicle width direction. This folded portion 60A abuts against the dash panel 20 (see FIG. 6).

Two bolt holes 60B are formed in an upper position and a lower position in a front end portion of the bracket 60. In addition, as is shown in FIG. 6, the bolt 64 are inserted into the bolt holes 60B and by screwing bolts 64 into weld nuts 66 that are provided on a rear surface side of the inner side surface 16B of the front side member 16, the bracket 60 is attached to the inner side surface 16B. In other words, the bracket 60 is attached in a cantilever state to the inner side surface 16B.

Here, the portion of the high-voltage power cables 40 that is laid inside the recessed portion 54 is held in the bracket 60 via a band 62. As is shown in FIG. 5, the band 62 is a toroidal component which is flexible and has a substantially elliptical outer shape when looked at in a plan view. Moreover, a structure is employed in which a projecting portion 62A projects outwards from an outer circumferential surface of the band 62, and the band 62 is attached to the bracket 60 by inserting this projecting portion 62A through the bracket 60 so as to anchor the bracket 60.

Furthermore, an attachment groove portion 62B having a somewhat smaller diameter than the diameter of the high-voltage power cables 40 is formed in the band 62. By manipulating the band 62 so as to enlarge the width of the attachment groove portion 62B, the high-voltage power cables 40 can be placed inside the band 62 through this attachment groove portion 62B. Once the two high-voltage power cables 40 have been placed inside the band 62, the projecting portion 62A is inserted through the band 62 so that the high-voltage power cables 40 are held in the bracket 60 via the band 62.

As is shown in FIG. 6, the two liquid coolant pipes 46 extend vertically following the dash panel 20 on the vehicle right side (i.e., on the inner side in the vehicle with direction) of the bracket 60. In other words, the high-voltage power cables 40 are disposed closer to the front side member 16 than are the liquid coolant pipes 46.

Actions

Next, actions of the present exemplary embodiment will be described.

In the vehicle lower portion structure 10 according to the present exemplary embodiment, as is shown in FIG. 1, the battery 44 is provided on the vehicle rear side of the dash panel 20, and this battery 44 is connected to the inverter 30 by the high-voltage power cables 40. Additionally, the high-voltage power cables 40 extend in the vehicle front-rear direction along the vehicle left side in the same way as the inverter 30. As a result, compared with when the high-voltage power cables 40 extend along the vehicle right side, the length of the high-voltage power cables 40 can be shortened. In other words, because the various pipes and the like are comparatively close to each other at the position of the dash panel 20 in the vehicle front-rear direction, is necessary to carefully arrange the pipe placement (and the wiring placement), however, the high-voltage power cables 40 are not placed adjacent to the exhaust pipe 32 which becomes heated to a high temperature. Because of this, when the exhaust pipe 32 is disposed within the floor tunnel 21 at the position of the dash panel 20, as is the case in the present exemplary embodiment, the high-voltage power cables 40 may be disposed either on the vehicle right side or on the vehicle left side. Moreover, because the inverter 30 is disposed on the vehicle left side, by placing the high-voltage power cables 40 on the vehicle left side in the same way as the inverter 30, it is possible to inhibit the length of the high-voltage power cables 40 from increasing, and to supply power extremely efficiently.

Moreover, in the present exemplary embodiment, the radiator 48 is connected to the battery 44 by the liquid coolant pipes 46, so that liquid coolant is circulated between the radiator 48 and the battery 44. As a result, even if a large-capacity battery 44 is used, this battery 44 can be inhibited from becoming heated to a high temperature. Furthermore, the liquid coolant pipes 46 extend in the vehicle front-rear direction along the vehicle left side in the same way as the high-voltage power cables 40. As a result, the liquid coolant pipes 46 can be kept separate from the exhaust pipe 32, so that it is difficult for the liquid coolant pipes 46 to be affected by heat from the exhaust pipe 32. In other words, it is possible to inhibit the liquid coolant inside the liquid coolant pipes 46 from being heated by heat from the exhaust pipe 32, so that the cooling performance of the liquid coolant pipes 46 can be maintained.

Furthermore, in the present exemplary embodiment, the fuel pipe 45 is disposed on the vehicle right side of the exhaust pipe 32 at the position of the dash panel 20. As a result, the high-voltage power cables 40 and the fuel pipe 45 are disposed on mutually opposite sides in the vehicle width direction sandwiching the exhaust pipe 32 so that, consequently, safety is improved.

In addition, in the present exemplary embodiment, as is shown in FIG. 2, the front side member 16 is provided on the vehicle left side of the inverter 30, and the high-voltage power cables 40 and the liquid coolant pipes 46 extend in the vehicle up-down direction following the dash panel 20 along the inner side surface 16B on the inner side in the vehicle width direction of the rear end portion of the front side member 16. As a result, in the event of a vehicle frontal collision, even if the transmission 28 (see FIG. 1) and the like that are disposed underneath the inverter 30 are moved (i.e., are pushed) towards the dash panel 20 side, it is possible to inhibit the high-voltage power cables 40 and the liquid coolant pipes 46 from becoming caught between the transmission 28 and the dash panel 20. In other words, if the high-voltage power cables 40 and the liquid coolant pipes 46 are disposed in a central portion in the vehicle width direction at the position of the dash panel 20, then they are positioned on the vehicle rear side of the transmission 28 so that it is easy for them to become caught. In the present exemplary embodiment, by placing the high-voltage power cables 40 and the liquid coolant pipes 46 in the above-described position, it is possible to inhibit the high-voltage power cables 40 and liquid coolant pipes 46 from being damaged in the event of a frontal collision of the vehicle 12. If the high-voltage power cables 40 and liquid coolant pipes 46 are disposed on the inner side in the vehicle width direction of the front side member 16, then they can also be protected by the front side member 16, which is a frame component, in the event of a side collision.

Moreover, in the present exemplary embodiment, as is shown in FIG. 6, the high-voltage power cables 40 are disposed on the outer side in the vehicle width direction of the liquid coolant pipes 46. In other words, the high-voltage power cables 40 are placed closer to the front side member 16 than are the liquid coolant pipes 46. As a result, is possible to inhibit the high-voltage power cables 40, in particular, from being caught in the event of a frontal collision of the vehicle 12, so that a superior level of protection can be provided for the high-voltage power cables 40.

In particular, in the present exemplary embodiment, because a portion of the high-voltage power cables 40 is laid inside the recessed portion 54, even if the transmission 28 is pushed against the front side member 16, it is possible to inhibit the high-voltage power cables 40 from being caught between the transmission 28 and the front side member 16. Moreover, because a portion of the high-voltage power cables 40 is held by the bracket 60 that covers the recessed portion 54 from the outer side in the vehicle width direction, the high-voltage power cables 40 can be held inside the recessed portion 54. Here, as is shown in FIG. 4, the recessed portion 54 is formed between an upper side edge line and a lower side edge line that form part of the inner side surface 16B of the front side member 16. In addition, because the upper side flange 16C and the inner side surface 16B are provided so as to sandwich the upper side edge line, it is possible to inhibit any reduction in the strength of the front side member 16.

Furthermore, in the present exemplary embodiment, the bracket 60 is attached in a cantilever state to the inner side surface 16B of the front side member 16. As a result, even if, in the event of a frontal collision, a collision load is input into the front side member 16 causing the front side member 16 to deform, the high-voltage power cables 40, together with the bracket 60, can be separated from the front side member 16, so that the high-voltage power cables 40 can be protected.

The vehicle lower portion structure 10 according to an exemplary embodiment of the present disclosure has been described above, however, it should be understood that various modifications and the like may be made thereto insofar as they do not depart from the spirit or scope of the present disclosure. For example, in the present exemplary embodiment, as is shown in FIG. 1, the engine 26 is disposed on the vehicle right side, while the transmission 28 and the inverter 30 are disposed on the vehicle left side, however, the present disclosure is not limited to this, and it is also possible for these to be disposed on their respectively opposite left and right sides. In other words, it is also possible for the transmission 28 and the inverter 30 to be disposed on the vehicle right side, and for the engine 26 to be disposed on the vehicle left side. In this case, the same effects as those of the present exemplary embodiment are obtained by placing the high-voltage power cables 40 and the liquid coolant pipes 46 on the vehicle right side, and by placing the fuel pipe 45 on the vehicle left side.

Moreover, in the present exemplary embodiment, as is shown in FIG. 5, the high-voltage power cables 40 are held in the bracket 60 by the band 62, however, the present disclosure is not limited to this. For example, it is also possible to provide a claw portion or the like in the bracket 60 itself that is capable of holding the high-voltage power cables 40. Additionally, the configuration of the band 62 is not particularly limited, and various configurations may be employed.

What is claimed is:

1. A vehicle lower portion structure comprising:
   an internal combustion engine that is disposed on one side, in a vehicle width direction, in a power unit compartment at a vehicle front portion;
   an inverter that is disposed on another side in the vehicle width direction in the power unit compartment;
   an exhaust pipe that extends in a vehicle front-rear direction through a dash panel separating the power unit compartment from a vehicle cabin and is disposed within a floor tunnel that is provided in a central portion in the vehicle width direction at least at a position of the dash panel, and whose one end portion is connected to the internal combustion engine;
   a battery that is provided on a vehicle rear side of the dash panel;
   high-voltage power cables that extend in the vehicle front-rear direction on the other side in the vehicle width direction and connect the inverter and the battery together; and
   liquid coolant pipes that extend in the vehicle front-rear direction on the other side in the vehicle width direction and cause a liquid coolant to circulate between a heat exchanger, which is provided in the vehicle front portion, and the battery.

2. The vehicle lower portion structure according to claim 1, wherein:
   a fuel tank is disposed on the vehicle rear side of the dash panel,
   the fuel tank and the internal combustion engine are connected to each other by a fuel pipe that extends in the vehicle front-rear direction, and
   the fuel pipe is disposed further to the one side in the vehicle width direction than the exhaust pipe at the position of the dash panel.

3. The vehicle lower portion structure according to claim 1, wherein:
   a front side member that extends in the vehicle front-rear direction and whose rear end portion is connected to the dash panel is provided further to the other side in the vehicle width direction than the inverter, and
   the high-voltage power cables and the liquid coolant pipes extend in a vehicle up-down direction following the dash panel along an inner side surface on an inner side in the vehicle width direction of the rear end portion of the front side member.

4. The vehicle lower portion structure according to claim 3, wherein the high-voltage power cables are disposed closer to the front side member than are the liquid coolant pipes.

5. The vehicle lower portion structure according to claim 4, wherein:
   a recessed portion that is recessed towards an outer side, in the vehicle width direction, is formed on the inner side surface of the front side member, and
   a portion of the high-voltage power cables is laid inside the recessed portion.

6. The vehicle lower portion structure according to claim 5, wherein:
   a bracket is provided that covers the recessed portion, from the inner side in the vehicle width direction, and
   a portion of the high-voltage power cables is laid inside the recessed portion so as to be held by the bracket.

7. The vehicle lower portion structure according to claim 6, wherein the bracket is attached in a cantilever state to the inner side surface of the front side member.

* * * * *

UNITED STATES PATENT AND TRADEMARK OFFICE
CERTIFICATE OF CORRECTION

PATENT NO.         : 10,596,894 B2
APPLICATION NO.    : 16/249638
DATED              : March 24, 2020
INVENTOR(S)        : Hidenori Matsuda It is certified that error appears in the above-identified patent and that said Letters Patent is hereby corrected as shown below:

In the Specification

In Column 3, Line 16, after "portion", delete ",".

In Column 4, Line 51, after "rear", insert --,--.

In Column 4, Line 54, after "vehicle", insert --,--.

In Column 6, Line 43, delete "riot", and insert --not--, therefor.

In Column 8, Line 58, after "62", delete "." and insert --,--, therefor.

In the Claims

In Column 12, Line 33, after "portion", delete ",".

Signed and Sealed this
Twenty-sixth Day of May, 2020

Andrei Iancu
*Director of the United States Patent and Trademark Office*